(No Model.)
J. P. GRONEMEYER & J. POLSTER.
COFFEE OR TEA POT.
No. 335,070. Patented Jan. 26, 1886.
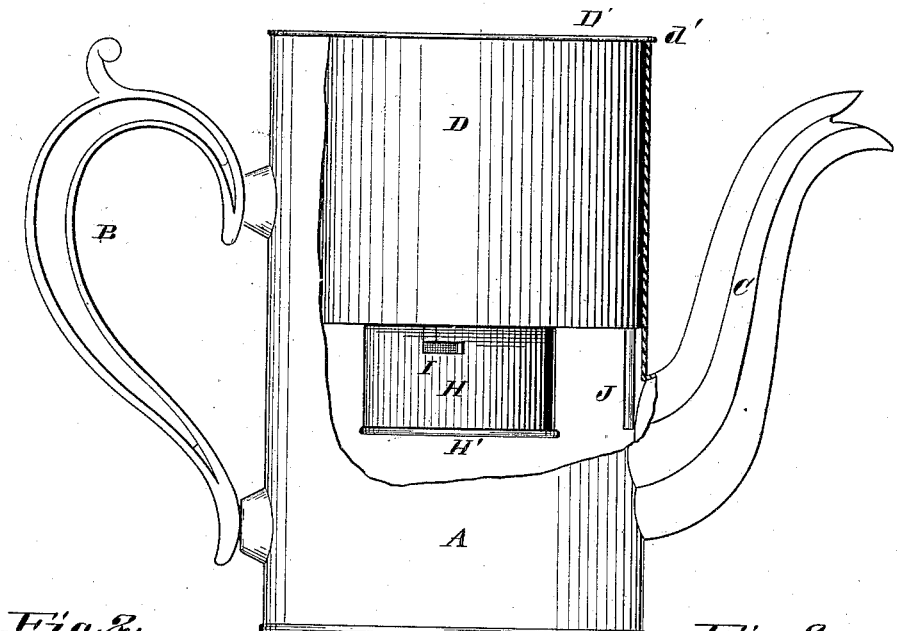
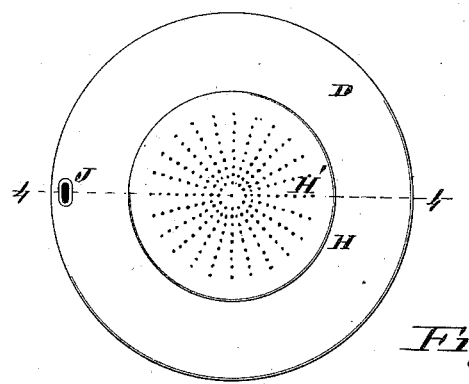
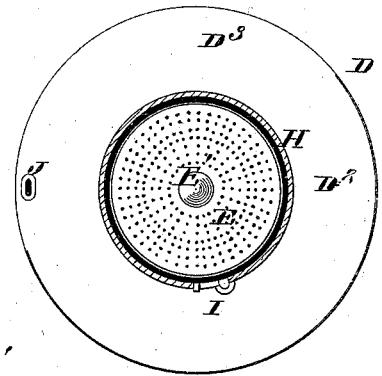
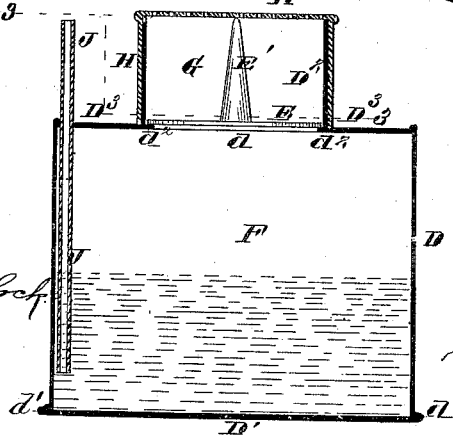
Attest:
Edward Stev.
Geo. L. Wheelock.
Inventor:
John P. Gronemeyer
John Polster
By Knight Bros.
Attys.

UNITED STATES PATENT OFFICE.

JOHN P. GRONEMEYER, OF ST. LOUIS, AND JOHN POLSTER, OF WARRENTON, MISSOURI.

COFFEE OR TEA POT.

SPECIFICATION forming part of Letters Patent No. 335,070, dated January 26, 1886.

Application filed June 5, 1885. Serial No. 167,761. (No model.)

*To all whom it may concern:*

Be it known that we, JOHN P. GRONEMEYER, of St. Louis, in the State of Missouri, and JOHN POLSTER, of Warrenton, Warren county, Missouri, have invented a certain new and useful Improvement in Coffee and Tea Pots, of which the following is a full, clear, and exact description, reference being had to the accompanying drawings, forming part of this specification.

Figure 1 is a side view of the pot with part broken out, showing the parts within. Fig. 2 is an end view of the vessel in which the dry coffee or tea and the water are placed. Fig. 3 is a horizontal section at 3 3, Fig. 4. Fig. 4 is a vertical section at 4 4, Fig. 2.

The outer vessel, A, is made of any suitable form and material, no novelty being claimed in the same. The handle is shown at B and spout at C.

D is a cylindrical vessel, which we will describe in the position shown in Fig. 4, which is the position it has when the water and the coffee or tea are first put into it. The flat bottom $D'$ has a marginal flange, $d'$, which bears upon the top of the vessel A when the parts are in the position shown in Fig. 1. The vessel D has a central aperture at $d$, and surrounding the same is a neck, $D^2$, within which the margin of the aperture forms a flange, $d^2$, upon which rests the margin of a perforate plate, E, which thus forms a lid to the water-chamber F, and division between that and the chamber G within the neck, into which the dry coffee or tea is put.

$E'$ is a post extending from the center of the plate E to about the plane of the top of the neck $D^2$.

H is a lid which slips upon the neck, and is secured thereon by a "bayonet" fastening or catch, I. The top $H'$ of the lid is perforated to allow the passage of steam when the vessel D is in the position shown in Fig. 4, and the passage of water when it is inverted, as seen in Fig. 1. When the lid is on the neck, it is in contact with the end of the post $E'$, and by this means the plate E is held against the bearing-flange $d^2$.

J is a small pipe extending through the annular top plate, $D^3$, and through the chamber F nearly to the bottom $D'$. The purpose of this pipe is to allow the entrance of air to take the place of the water which runs out of the chamber F when the vessel D is inverted. (See Fig. 1.)

The operation is as follows: The required quantity of water is put into the chamber F when the vessel D is in the position shown in Fig. 4. Then the plate E is put in position, and the ground coffee or tea put into the chamber G and the lid H fixed on the neck. The vessel D is then placed on top of a stove or over a spirit-lamp so as to raise the water to the boiling-point. When the steam commences to escape through the lid H, the pot A is inverted and forced down upon the vessel D, and then the whole lifted and the pot stood upon its bottom. The water now percolates through the coffee or tea, and the decoction collects in the lower part of the pot.

Gauze may be used in place of the perforate metal for either the diaphragm E or top $H'$ of lid H, or both. The post $E'$ is shown as attached to the diaphragm, and forms a handle for the diaphragm, and a means by which it is held down.

We claim—

1. A coffee and tea pot attachment consisting of a vessel having a water-chamber and a chamber for the material, a diaphragm between the chambers, a perforated cap to the chamber for the material, and a pipe for the admittance of air to the water-chamber, substantially as set forth.

2. A coffee and tea pot attachment consisting of a vessel, D, formed with a bottom, $D'$, having a marginal flange, $d'$, an opening, $d$, a neck, $D^2$, and a flange, $d^2$, surrounding the opening, the cap H, having a perforated top, $H'$, the diaphragm E, formed with perforations and having post $E'$ extending to the top, and the air-pipe J, substantially as set forth.

JOHN P. GRONEMEYER.
JOHN POLSTER.

Witnesses to signature of Gronemeyer:
SAML. KNIGHT,
GEO. H. KNIGHT.

Witnesses to signature of Polster:
GEO. POLSTER,
FRED. DREWER.